(12) United States Patent
Perkins

(10) Patent No.: US 11,187,207 B1
(45) Date of Patent: Nov. 30, 2021

(54) AIRFOIL-BASED AIR TURBINE

(71) Applicant: Daniel Brett Perkins, Tallahassee, FL (US)

(72) Inventor: Daniel Brett Perkins, Tallahassee, FL (US)

( * ) Notice: Subject to any disclaimer, the term of this patent is extended or adjusted under 35 U.S.C. 154(b) by 0 days.

(21) Appl. No.: 17/061,019

(22) Filed: Oct. 1, 2020

(51) Int. Cl.
*F03D 9/00* (2016.01)
*F03D 9/32* (2016.01)

(52) U.S. Cl.
CPC ..................... *F03D 9/32* (2016.05)

(58) Field of Classification Search
CPC ............................... F03D 9/32; F03D 3/0472
USPC ....................................... 290/44, 55
See application file for complete search history.

(56) References Cited

U.S. PATENT DOCUMENTS

| | | | | |
|---|---|---|---|---|
| 3,556,239 A * | 1/1971 | Spahn | ...................... | B60K 6/48 180/65.25 |
| 3,621,930 A * | 11/1971 | Dutchak | ............... | H02J 7/1415 180/65.31 |
| 4,019,828 A * | 4/1977 | Bunzer | ..................... | F03D 9/32 416/55 |
| 7,135,786 B1 * | 11/2006 | Deets | ..................... | F03D 13/20 290/55 |
| 10,207,588 B1 * | 2/2019 | Roden | ...................... | F03D 9/32 |
| 2003/0155464 A1 * | 8/2003 | Tseng | ........................ | F03D 9/32 244/58 |
| 2012/0085587 A1 * | 4/2012 | Drouin | ..................... | F03D 9/32 180/2.2 |
| 2013/0127393 A1 * | 5/2013 | Garcia | ................... | F03D 15/10 320/101 |

* cited by examiner

*Primary Examiner* — Julio C. Gonzalez
(74) *Attorney, Agent, or Firm* — J. Wiley Horton

(57) ABSTRACT

A compact air turbine configured to convert some of the energy from a stream of passing air into electrical energy. The turbine is placed on a moving vehicle in a location where drag is occurring and may in fact be placed in a location where additional drag is desirable. The preferred embodiments incorporate a movable inlet ramp or door to aid in self-starting and increase efficiency.

18 Claims, 16 Drawing Sheets

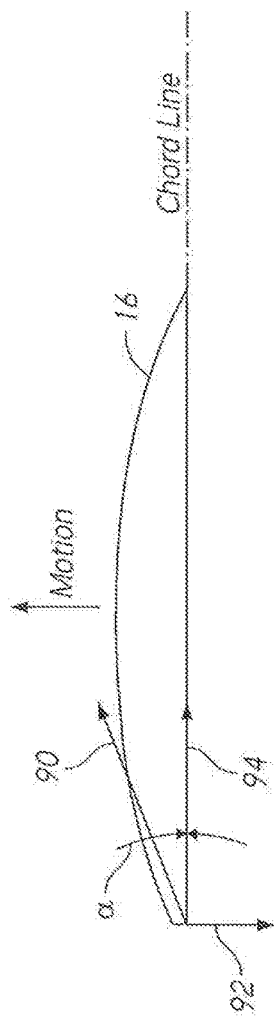
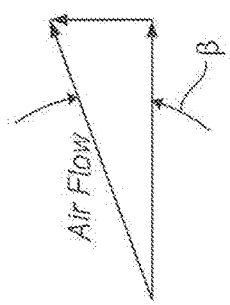
FIG. 16

AIRFOIL-BASED AIR TURBINE

BACKGROUND OF THE INVENTION

1. Field of the Invention.

This invention relates to the field of energy conversion. More specifically, the invention comprises a system and method for producing electrical energy from a stream of moving air.

2. Description of the Related Art.

The concept of converting some of the energy conveyed by a stream of moving air into electrical energy is an old one. Wind-powered machinery was first developed by at least the ninth century. Tower mills, which incorporate all the basic concepts of the modern wind turbine, were in use in western Europe by the thirteenth century. These devices incorporated a pivoting wooden "cap" atop a masonry tower. Rotating "sails" were attached to a horizontal shaft mounted in the cap. The energy harvested from the wind was transferred by geared shafts to drive various machinery—typically grinding mills.

The same concepts are used today for high-efficiency wind turbines. These devices have a pivoting nacelle mounted atop a steel tower. A horizontal drive shaft is mounted to the front of the nacelle. A rotating blade assembly typically includes three blades attached to the hub. The blades and hub look like a giant propeller. Wind passing through tire plane of the blades causes the assembly to turn—thereby providing power to the horizontal drive shaft. These turbines are commonly referred to as a horizontal axis wind turbine ("HAWT").

Modern large HAWTs turbines turn slowly—typically no more than 20 RPM. A gearbox increases the input speed of the hub in order to drive a generator at a faster and more efficient speed. The generator converts the mechanical energy to electrical energy which is transported away from the wind turbine and typically placed on a power grid. Modern electrical switching equipment allows the power generated in a wind turbine to be amplitude and phase matched to a desired distribution grid. Thus, the rotational speed of the turbine is not significant to the production of synchronous power.

Vertical axis wind turbines ("VAWTs") are also known. The Darrieus turbine—credited to French engineer Georges Jean Marie Darrieus—presents a structure that docs not need to be pivoted with changing wind direction. However, the Darrieus design is generally not self-starting and is also difficult to protect in high winds (since it has no feathering capability that, can be used to stop rotation).

The Savonius VAWT—credited to Finnish engineer Sigurd Johannes Savonius—easily self starts. In recent years a Savonius "core" has been added to a Darrieus turbine in order to make the Darrieus design self starting while still retaining the potential for a compact design. Excessive rotation speeds in high winds are still a problem for these duplex designs, however.

There are many instances where a turbine having a compact design would allow the extraction of energy from a moving air stream without unduly interfering with other operations. One good application is the placement of such a turbine on a moving vehicle. Of course, such a wind turbine cannot violate the first law of thermodynamics and produce more energy than the negative energy (drag) the introduction of the turbine creates. However, such a turbine can be placed in a location where drag is actually desirable. In this scenario the extraction of some energy from the passing air flow is a recovery of energy that would otherwise be wasted. The present invention provides a compact design that can take advantage of these situations.

BRIEF SUMMARY OF THE INVENTION

The present invention comprises a compact air turbine configured to convert some of the energy from a stream of passing air into electrical energy. The turbine is placed on a moving vehicle in a location where drag is occurring and may in fact be placed in a location where additional drag is desirable. The preferred embodiments incorporate a movable inlet ramp or door to aid in self starting and increase efficiency.

BRIEF DESCRIPTION OF THE SEVERAL VIEWS OF THE DRAWINGS

FIG. 16 is an elevation view, explaining the effect of the inlet ramp on the rotor's airfoils.

Figure 1:
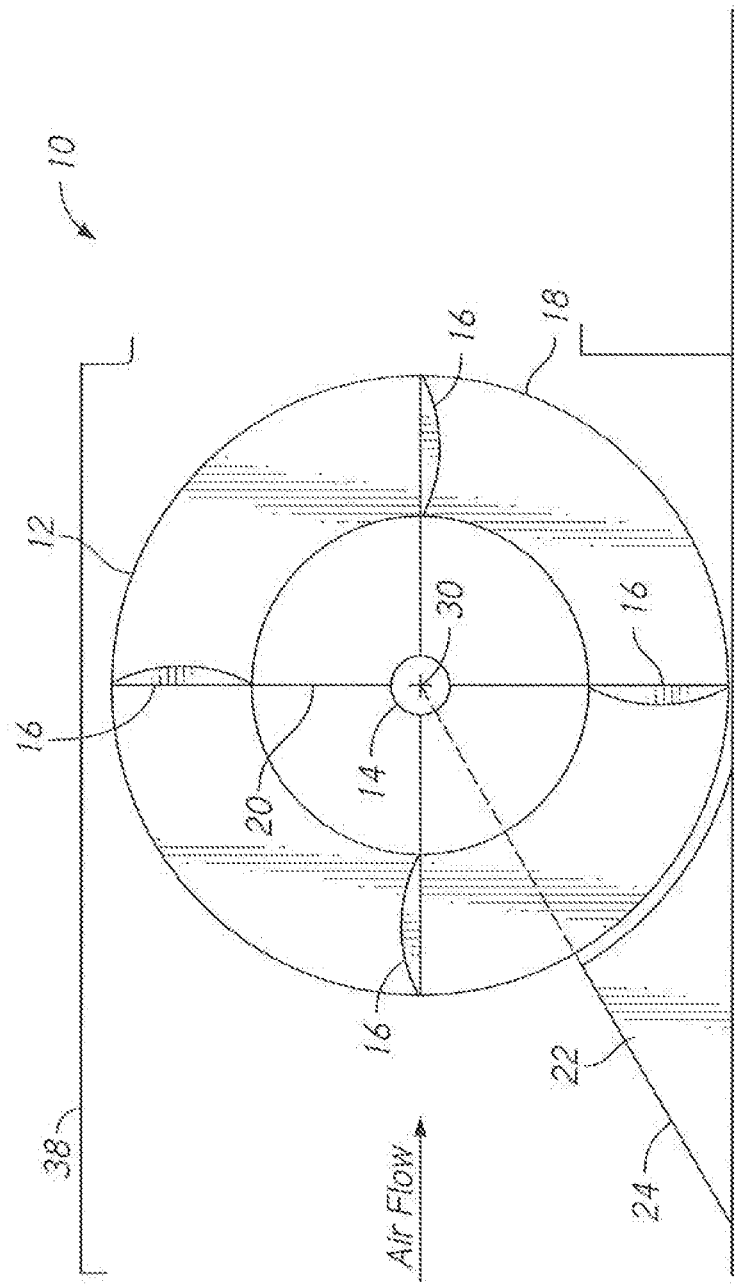
FIG. 1 is an elevation view, showing a conceptual depiction of a turbine made according to the present invention.

REFERENCE NUMERALS IN THE DRAWINGS 10 turbine
12 rotor
14 hub
16 airfoil
18 airfoil mount
20 spoke
22 occluder
24 inlet ramp
26 first side
28 second side
30 axis
32 axle
34 airfoil mount
35 airfoil mount
36 axle 38 housing
40 mounting tab
42 generator
43 PWM controller
44 power plug
46 control plug
48 outlet duct
50 housing
52 generator
54 generator
58 mounting tab
60 inlet ramp
62 turbine
64 truck
66 cab
68 wind deflector
70 outlet
72 housing
74 inlet door
76 fairing
78 outlet duct
80 car
81 outlet duct
82 rack mounted assembly
84 house
86 eave
88 roof
90 airflow vector
92 rotor motion vector
94 resultant velocity vector
96 actuator

DETAILED DESCRIPTION OF THE INVENTION

The following descriptions present multiple embodiment of the claimed invention. Some features are described with some embodiments and not with others. It is impractical to illustrate every permutation of the various embodiments. Thus, those skilled in the art will understand that the features described can be combined in ways that have not been illustrated or described. In addition, those skilled in the art—upon reviewing this disclosure—will understand the existence of other embodiments of the invention. The invention encompasses all these embodiments and is not limited to the specific embodiments described.

FIG. 1 shows a simplified elevation view of the inventive turbine 10. Rotor 12 spins on a horizontal axis 30. The rotor includes hub 14 at its center, and this hub is rotationally mounted to housing 38. The hub is preferably connected to the housing using friction-limiting devices such as roller bearings.

Multiple airfoils 16 are mounted on rotor 12 via airfoil mount 18. In the version shown, airfoil mount 18 comprises an outer ring and an inner ring connected by four spokes 20. The orientation of each of the airfoils is significant. The direction of incoming air is indicated in FIG. 1 by an arrow.

Figure 2:
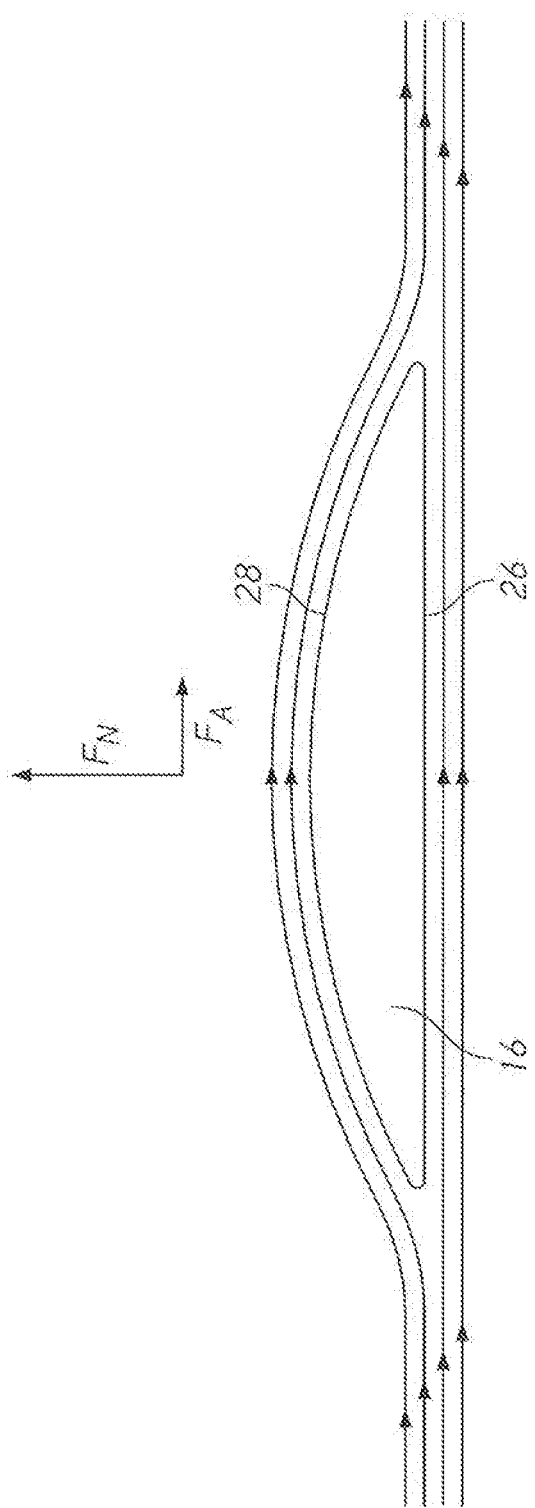
FIG. 2 is an elevation view, showing airflow over one of the airfoils used in the present turbine.

The airfoil 16 on the left side of FIG. 1 has its chord parallel to the incoming air flow. FIG. 2 shows an elevation view of this same airfoil 16. The streamlines show how the air splits and flows around airfoil 16. First side 26 of the airfoil is flat and does not impede the air flow (other than by surface friction). Second side 28 is convex. The second side forces the air to take a longer path—thereby increasing its velocity. According to Bernoulli's principle, the air flowing at a higher velocity over the convex side of the airfoil results in reduced pressure. Thus, a normal force $F_n$ is produced. This is the same as a lifting force that is normally produced by an aircraft wing moving through still air. The normal force urges the airfoil in an intended direction of motion. Thus, the convex side protrudes outward in the direction of desired motion for the airfoil (as the turbine's rotor rotates).

Returning now to FIG. 1, the reader will appreciate that the creation of the normal force in the airfoil on the left of the view will tend to rotate rotor 12 in the clock wise direction. If the air is allowed to flow through the mostly open space of the rotor and then across the airfoil 16 on the right side of the view, the normal force produced by that airfoil will be in the downward direction. This will also tend to rotate rotor 12 in the clockwise direction. The reader will note that the convex side of each airfoil protrudes outward in the direction of desired motion for that airfoil.

Occluder 22 is preferably provided to impede and redirect airflow through a portion of the inventive turbine. In the airfoil orientation shown in the embodiment of FIG. 1, the occluder is placed below hub 14. The occluder can simply be a flat plate. A flat plate will work, as it forces air flow toward the airfoils that are retreating from the region of the occluder and reduces the air flow directed toward the airfoils that are advancing toward the occluder—thereby producing rotation. However, it is advantageous to provide an inlet ramp 24 that more smoothly bends the flow coming into the rotor rather than simply blocking it. The inlet ramp shown has a 30-degree angle of incidence with respect to the incoming flow. Other angles are optimum for other flow velocities. The angle of the inlet ramp can in fact be made variable so that the angle can be optimized for the incoming flow velocity.

In the embodiment of FIG. 1 a dashed line is drawn parallel to the plane of the inlet ramp. The reader will note that this dashed line passes through axis 30 in hub 14. If one rotates the rotor, each flat side of each airfoil will at some point lie on the dashed line. At this point the flat side of the airfoil will be parallel to the inlet ramp. The inlet ramp tends to produce air flow that is parallel to itself (at the point where the flow exits the ramp). This will also be parallel to the flat side of an airfoil that stops immediately adjacent to the ramp. In the event that the rotor stops with an airfoil in this position, the turbine will still be self-starting when flow is reintroduced. Further, the airfoil that has stopped in this position will produce a normal force in the right direction immediately upon the introduction of flow.

Figure 3:
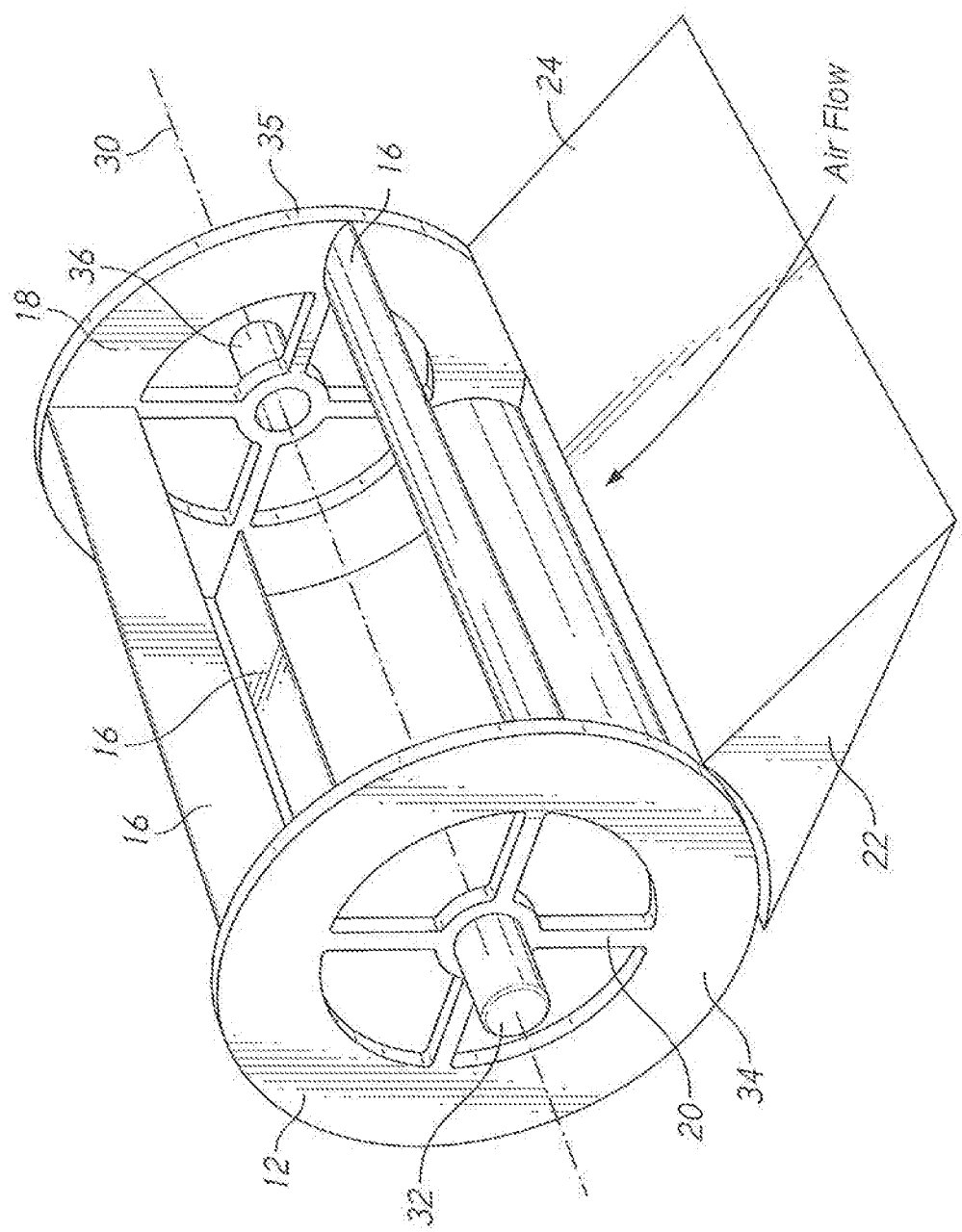
FIG. 3 is a perspective view, showing the rotor and inlet ramp of the inventive turbine.
Figure 15:
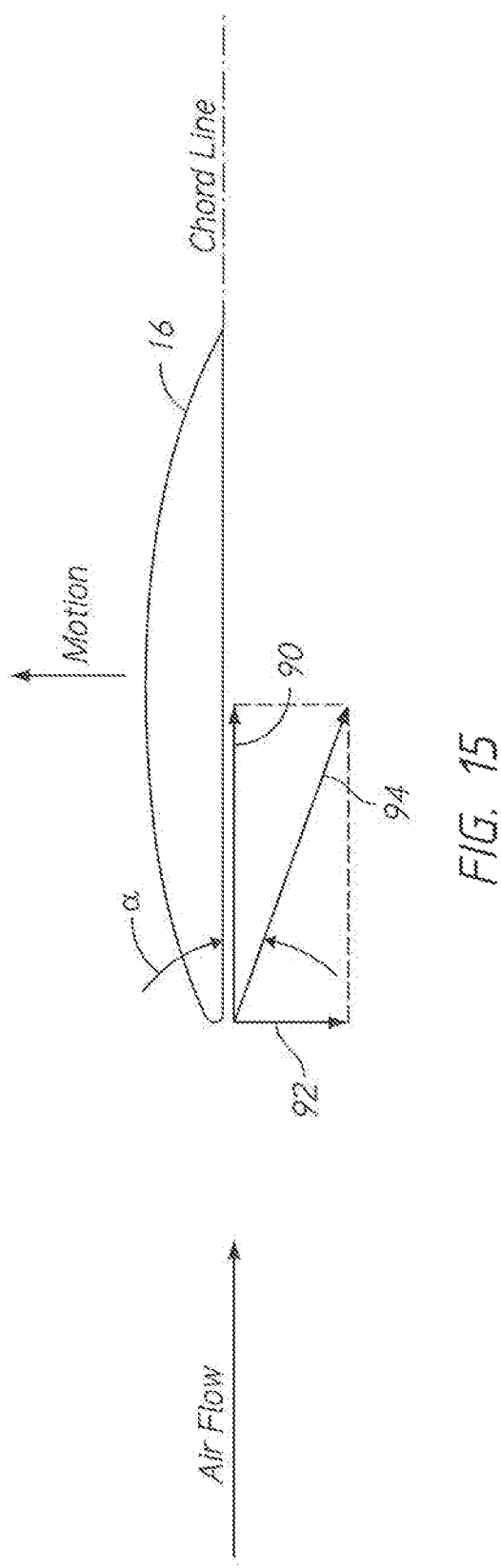
FIG. 15 is an elevation view, explaining the effect of the inlet ramp on the rotor's airfoils.

FIG. 3 provides a perspective view of a rotor 12 having a more practical airfoil mounting system. The airfoils are provided in the same position and orientation as shown in the embodiment of FIG. 1. In the example of FIG. 3, two airfoil mounts 34, 35 are provided—one for each end of the elongated airfoils 16. This creates a suitably rigid rotor 12. Axis 30 passes through the center of rotation for the rotor. Axle 32 extends outward from airfoil mount 34 while axle 36 extends outward from airfoil mount 35. Occluder 22 is again provided to redirect the incoming air flow. Inlet ramp 24 urges the airflow upward so that the leading airfoil (the one on the right side in the orientation of FIG. 3) experiences a positive angle of attack even while rotating. FIGS. 15 and 16 are provided to explain an operational advantage of the inlet ramp.

FIG. 15 shows an airfoil 16 in a position such as occupied by the left airfoil in the view of FIG. 1. The airflow coming in from the left is horizontal, which is parallel to the airfoil's chord line. However, in the instant shown in FIG. 15, the rotor to which the airfoil is attached is rotating clockwise. This causes airfoil 16 to have an upward motion. The forces developed by an airfoil are dependent upon its angle of attack with respect to the surrounding air flow. Airflow vector 90 represents the airflow. However, rotor motion vector 92 results from the upward motion of the airfoil (which the airfoil "sees" as a corresponding downward motion of the incoming air). Resultant velocity vector 94 is the airflow actually experienced by airfoil 16 when the rotor motion is taken into account. The angle of attack ($\alpha$) in this case is negative—producing a normal force that opposes the rotation of the rotor.

FIG. 16 is an alternate situation for the same airfoil and rotor. In the case of FIG. 16, an inlet ramp has deflected the incoming air flow by an angle $\beta$ (bending it upward). Airflow vector 90 is therefore no longer parallel to the aerodynamic chord line of the air foil. Rotor motion vector 92 is summed with airflow vector 90 to produce resultant velocity vector 94. In this second case the resultant velocity vector 94 is parallel to the chord line and the angle-of-attack is zero (Of course a normal force is still produced even for a zero angle-of-attack because of the shape of the airfoil).

Figure 4:
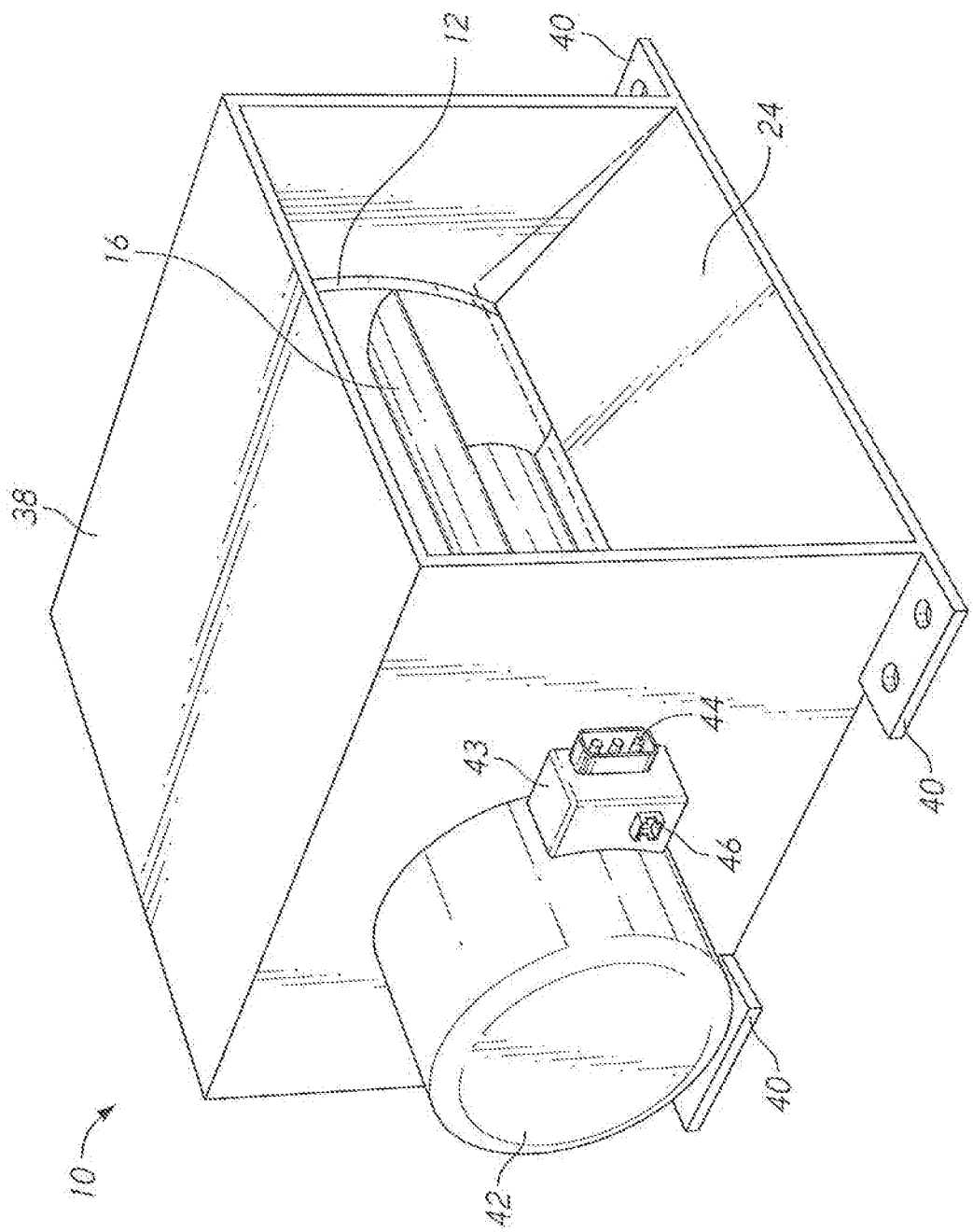
FIG. 4 is a perspective view, showing an exemplary housing and generator for the inventive turbine.

From the vector diagrams shown in FIGS. 15 and 16 it will be apparent that the ideal deflection in the incoming airflow depends on the rotor speed—with a higher angular deflection being needed for a higher rotor speed. Returning to FIG. 1, the effect of occluder 22 is to allow the rotor to self-start and obtain a stable speed with a fixed angle for the inlet ramp. A variable-angle inlet ramp allows further optimization. FIG. 4 illustrates the possibility of a variable inlet ramp. The dashed lines show inlet ramp 24 moved to an angular position having a greater slope while the solid lines show the inlet ramp at a lesser slope. At higher rotor speeds an increase in the inlet ramp angle allows an additional increase in rotor speed and greater power production. However, a variable-angle ramp also adds complexity. Many embodiments will achieve satisfactory performance with a fixed inlet ramp angle.

The render will thus appreciate how the inlet geometry shown in FIG. 3 cooperates with the airfoils mounted in rotor 12. Of course, a suitable housing is needed to mount the rotor and other components used to extract energy from the turning rotor. FIG. 4 shows housing 38, which mounts rotor 12 and inlet ramp 24. The inlet ramp may be fixed or variable. The rotor spins on its horizontal axis. Generator 42 is connected directly to the rotor. As the rotor spins, electrical power is created within generator 42.

The generator can assume many forms and the invention is not limited to any particular form. In this embodiment, PWM controller 43 produces direct current at a suitable voltage for use in an energy storage system. In other examples, the PWM controller may generate phase and amplitude matched alternating current suitable for feeding onto an electrical grid or more local power distribution system. Power plug 44 is provided for the conductors used to carry the power generated. Control plug 46 is used for monitoring and control communications—such as when an external system controller is used to regulate one or more such turbines. Suitable mounting features are preferably provided on the housing. In the example of FIG. 4, a mounting tab 40 is provided for each corner of the housing.

Figure 5:
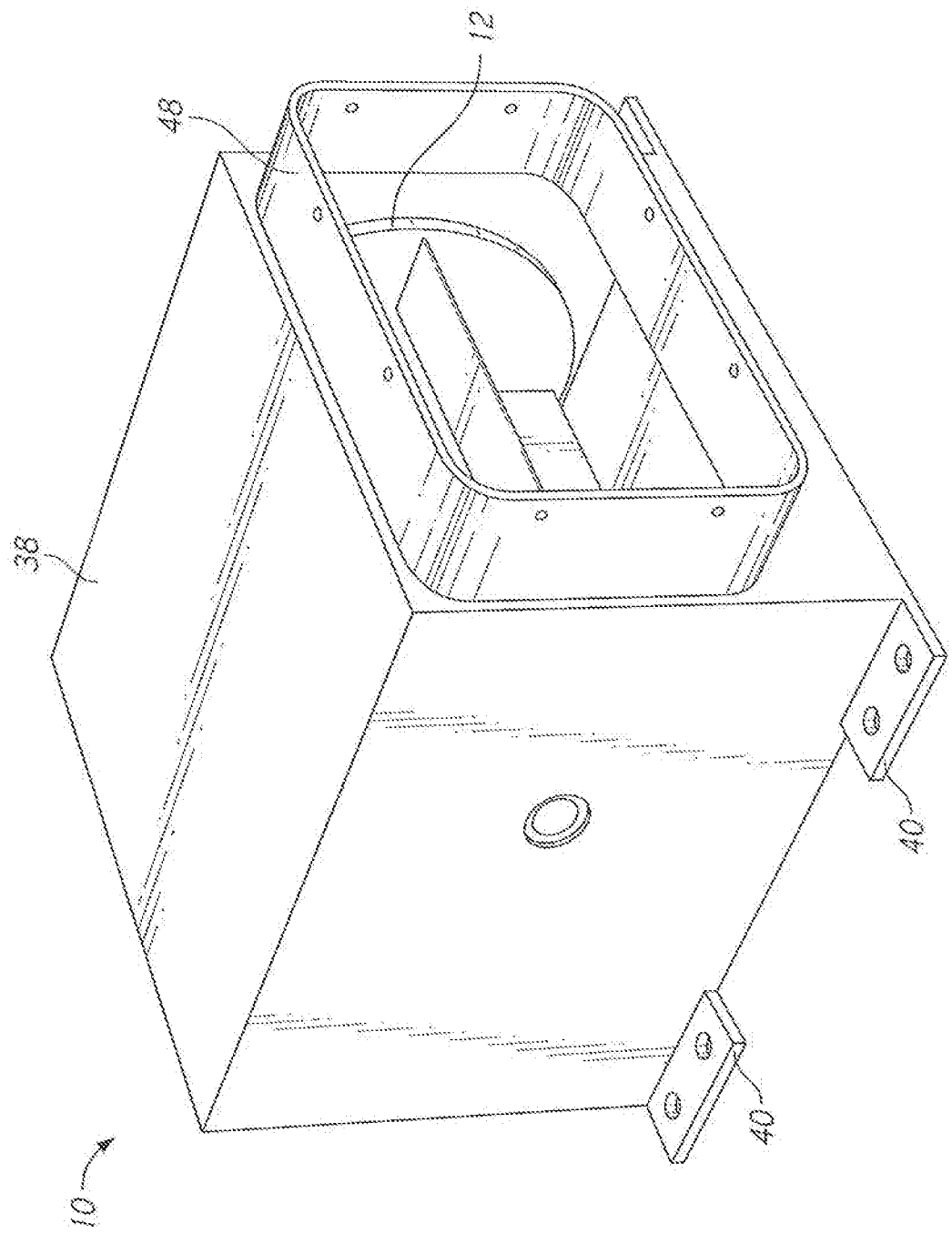
FIG. 5 is a perspective view, showing the embodiment of FIG. 4 from a different vantage point.

FIG. 4 shows the inlet side of the assembly the side which receives the incoming air flow. FIG. 5 shows the outlet side of the same device. Outlet duct 48 allows the air escaping the back side of rotor 12 to leave the housing. A conduit for this escaping air may be attached to outlet duct 48 in order to carry the exhaust air to another location.

Figure 6:
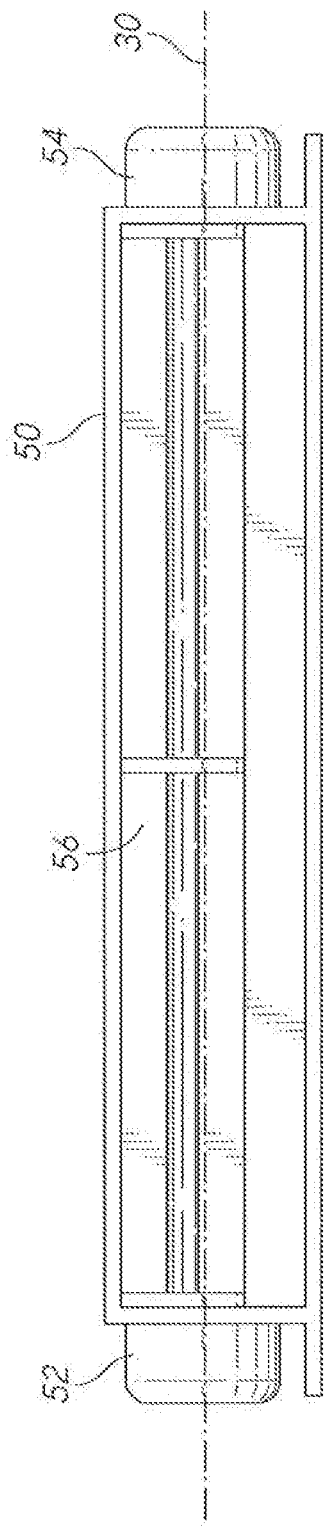
FIG. 6 is an elevation view, showing a second embodiment of the inventive turbine.

FIG. 6 shows an alternate embodiment of the inventive turbine. In this example the two airfoil mounts are separated by a greater distance so that the airfoils can be much longer. This produces a much longer overall length for rotor 56.

Figure 7:
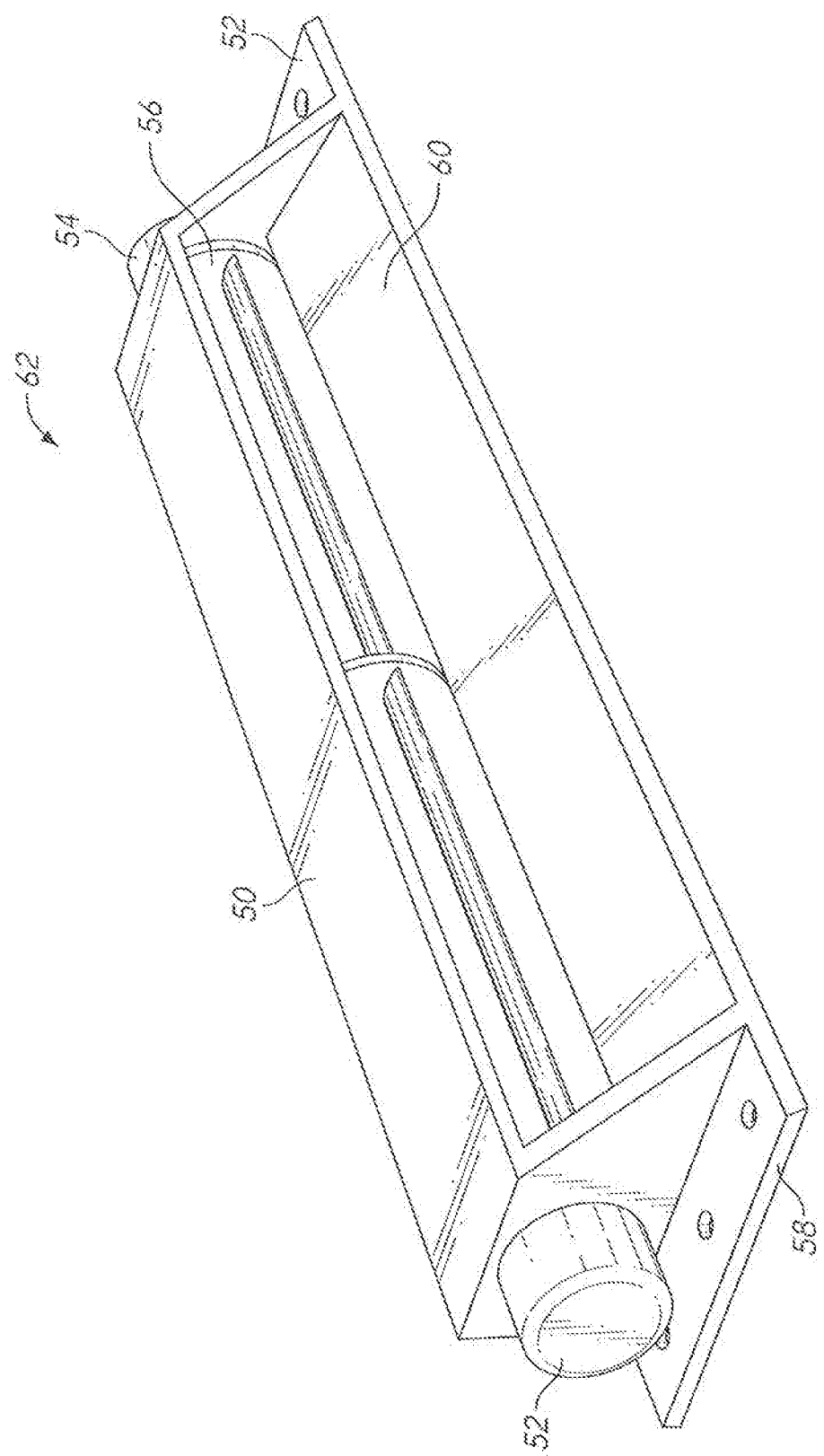
FIG. 7 is a perspective view, showing the intake side of the embodiment of FIG. 6.

Housing 50 must also be substantially elongated. Two generators 52,54 are used in this version—one attached to each end of the elongated rotor. FIG. 7 provides a perspective view of this same embodiment. The inlet side of housing 50 is sloped to provide for integration into a slanted surface. A curved or other more complex shape can also be used. Inlet ramp 60 extends across the width of the inlet leading to rotor 56. Mounting tabs 58 are provided on either side of the housing.

Figure 8:
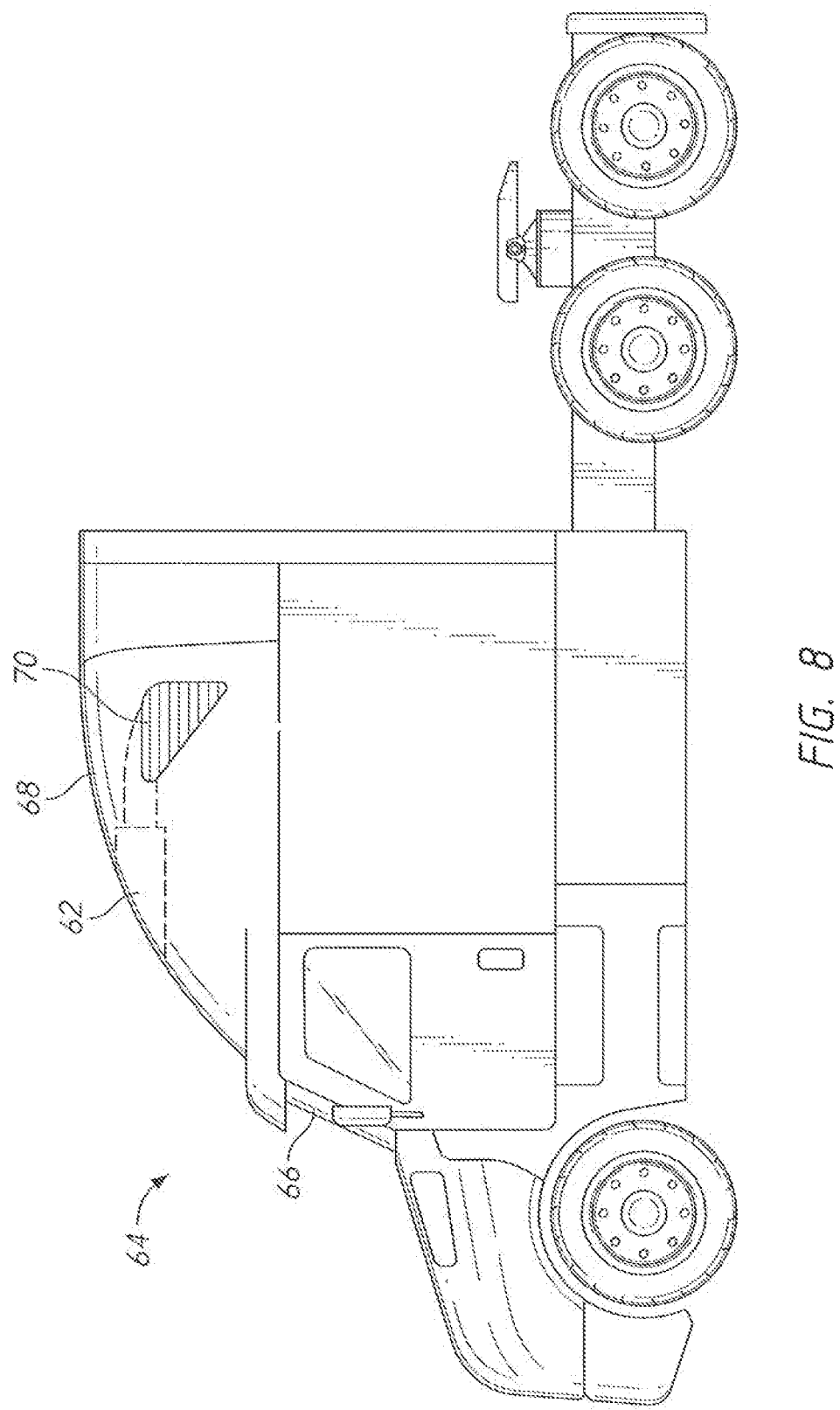
FIG. 8 is an elevation view, showing an installation of the inventive turbine in a large truck.

The inventive turbine can be installed in many different locations for purposes of energy recovery. FIG. 8 shows a first exemplary installation. Long-haul truck 64 includes a large wind deflector 68 mounted over its cab 66. The wind deflector adds drag to the cab, but smooths the air flowing over the forward portion of a trailer being towed by the truck.

Turbine 62 is installed across the leading surface of wind deflector 68 with its slanted leading surface being integrated into the slope of wind deflector 68. The turbine exhaust air is split and flows out through an outlet 70 on either side of the wind deflector. Some of the air that would pass over the wind deflector is therefore routed through turbine 62. This airflow is used to generate electricity, which can be stored or used to carry electrical loads in the truck.

Figure 9:
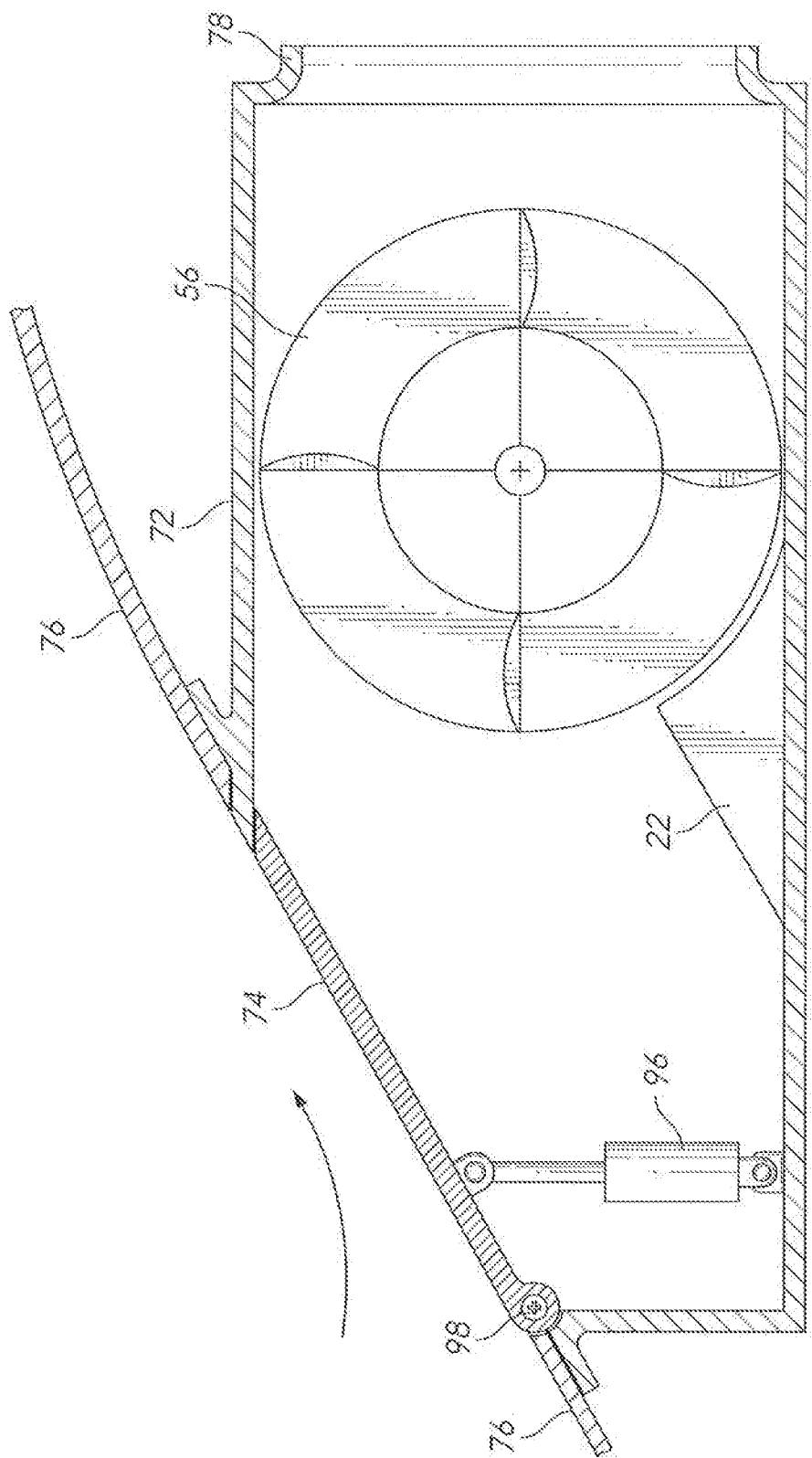
FIG. 9 is an elevation view, showing a third embodiment of the inventive turbine.
Figure 10:
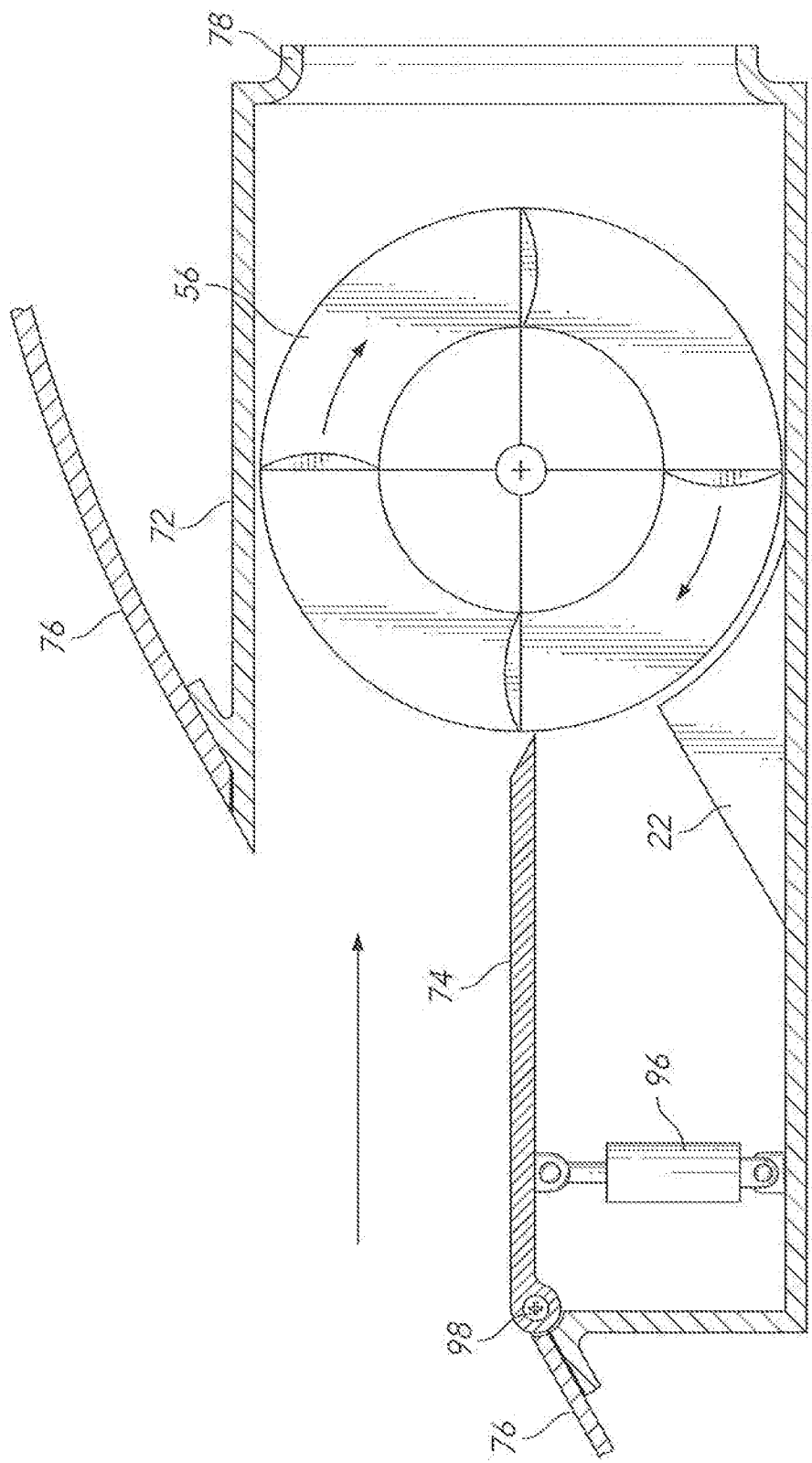
FIG. 10 is an elevation view, showing the embodiment of FIG. 9 with its inlet door in the open position.

FIGS. 9 and 10 show an additional feature that may be added to the embodiments. The rotor and housing in this example are similar to those components in the embodiments of FIGS. 6 and 7. However, an additional control component has been added to housing 72. Housing 72 is installed with its intake side resting in an opening in fairing 76. Fairing 76 can be any portion of a moving vehicle with air flowing past in while the vehicle is in motion. A suitable fairing will often be on the upper surfaces of a vehicle, but it could also be on the side or bottom of the vehicle.

In FIG. 9, the inlet to the inventive turbine is closed by inlet door 74. Inlet door 74 is pivotally mounted to housing 72 by pivot joint 98. Actuator 96 controls the position of the inlet door. In the position of FIG. 9, none of the passing air flow enters the turbine. Instead, it is directed upward along fairing 76.

In FIG. 10, actuator 96 has been activated in order to open inlet door 74. Ram air then enters the inventive turbine and begins to spin rotor 56. Exhaust air is carried out through outlet duct 78. Occluder 22 can be provided as well. However, the position of inlet door 74 allows it to act like an occlude and even allows it to set an optimized angle of attack between the inlet air and the airfoils on the rotor. Inlet door 74 can be pivoted upward from the position shown in FIG. 10, yet not fully closed. This will deflect the air upward and also create some ram-air compression. The inlet door position may therefore be varied according to the rotor speed to select a desired amount of drag and a desired amount of energy production. A suitable control system can be provided to meet these objectives. The control system can be a closed-loop system that monitors generator RPM and varies the position of the inlet door as needed.

Figure 11:
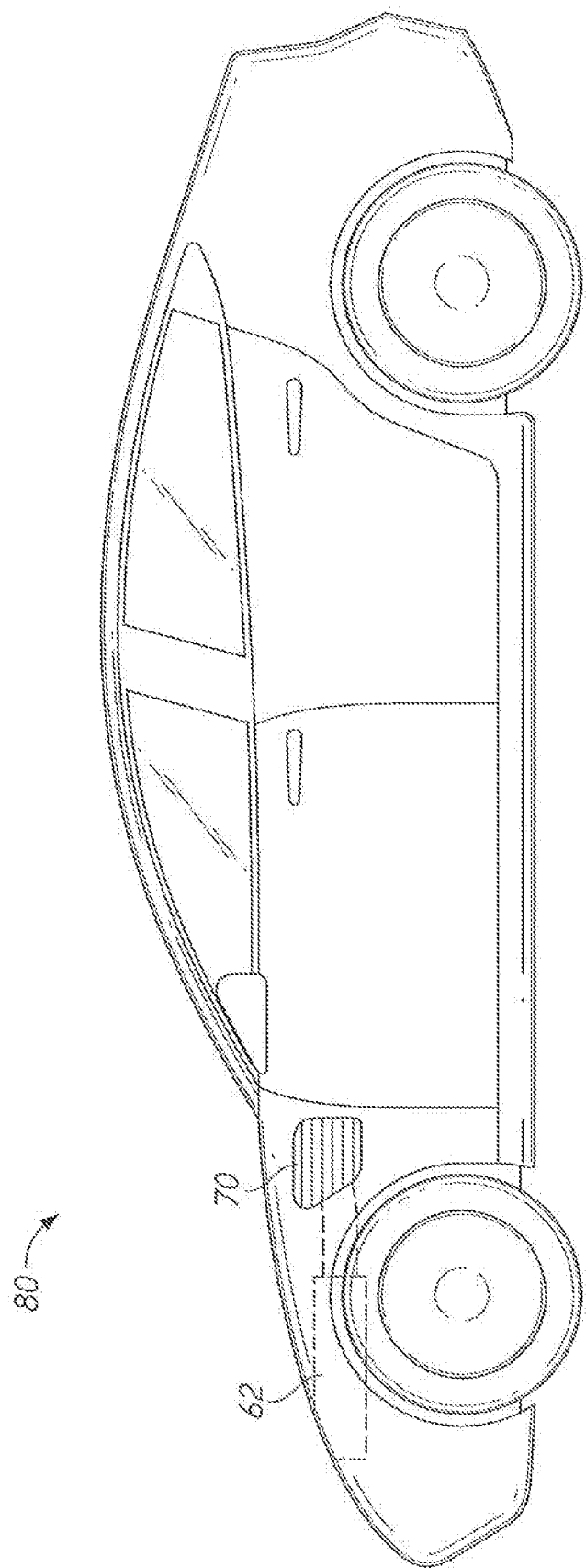
FIG. 11 is an elevation view, showing an installation of the inventive turbine in a passenger car.

FIG. 11 shows a second exemplary application for the inventive turbine. Car 80 in this view is an electric car using storage batteries mounted tow in the vehicle. These storage batteries drive traction motors connected directly to the wheels. The shape of the body in the area around the front wheels is largely dictated by (1) the need to house the front wheels in an aerodynamic fairing, (2) the need to meet bumper height requirements for frontal impacts, and (3) the need to smoothly blend the front bumper area into the base of the windshield. In such vehicles there is often a significant amount of space available beneath the hood. This was a volume traditionally consumed by an internal combustion engine and its cooling accessories. However, for a fully electric vehicle, this volume is largely empty. The inventive turbine 62 can be placed in this area with its inlet being a slot-like inlet door across the hood. The turbine exhaust duct is again split—carrying its flow out an outlet 70 on either side of the vehicle.

Such a vehicle in cruise needs low aerodynamic drag for efficiency. In this operating regime the inlet door is closed. However, whenever a speed seduction is commanded, the inlet door opens and the inventive turbine begins extracting energy from the air flow. This additional drag aids in braking while also harvesting energy.

Figure 12:
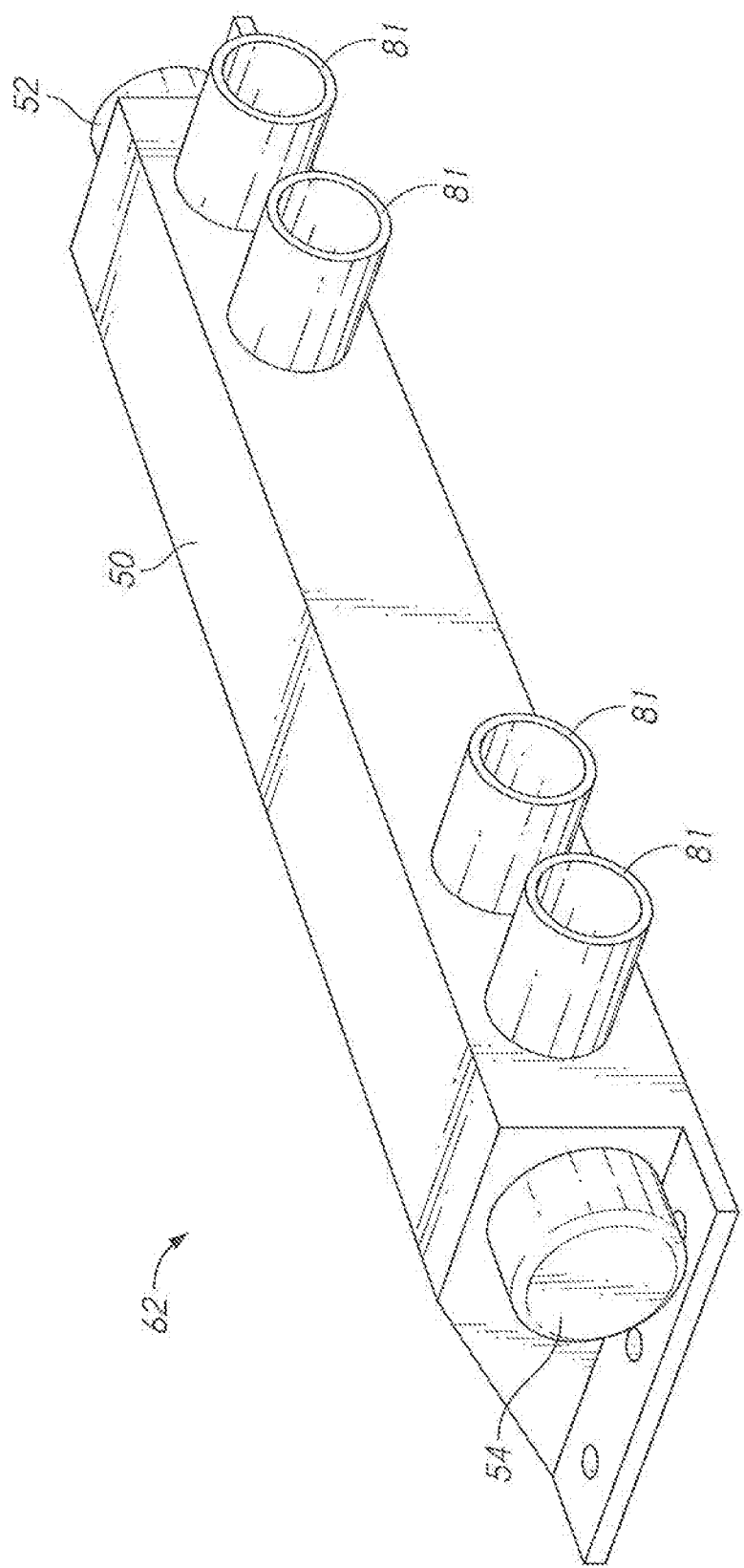
FIG. 12 is a perspective view, showing the use of multiple outlet ducts for the inventive turbine.
Figure 13:
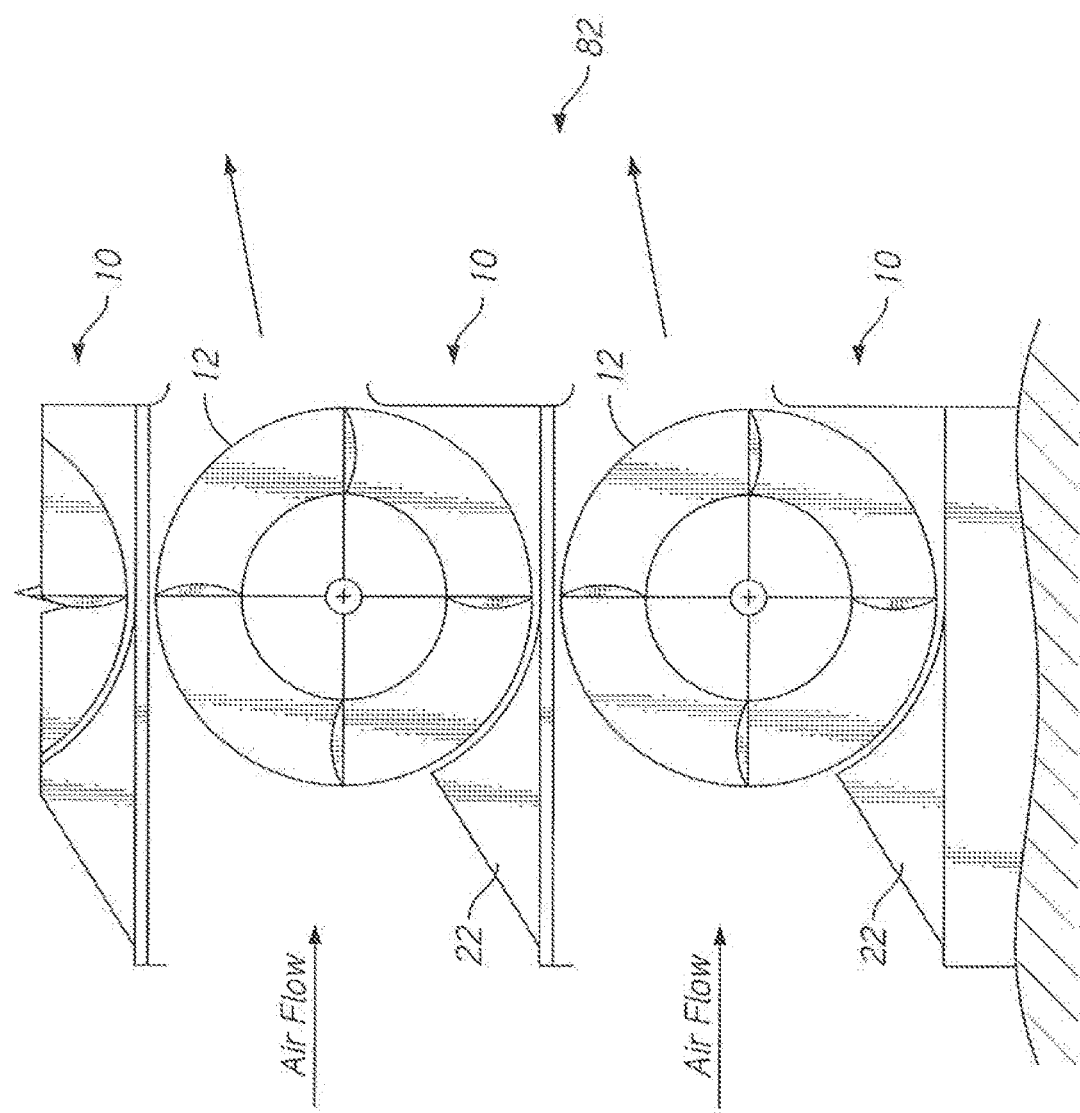
FIG. 13 is an elevation view, showing the use of multiple turbines in a rack mounted assembly.
Figure 14:
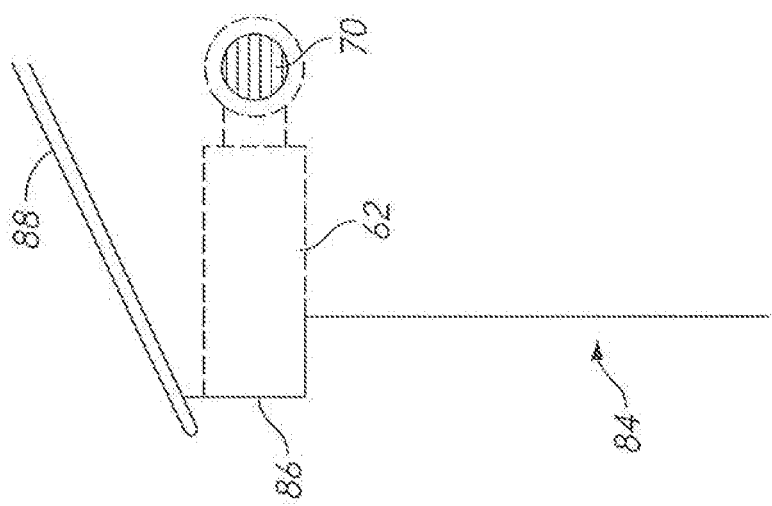
FIG. 14 is an elevation view, showing an installation of the inventive turbine in a structure.

FIG. 12 shows the outlet side of an embodiment such as used in FIG. 11. Multiple outlet ducts 84 are provided on the outlet side. Round flexible ducts can carry the exhaust air from these multiple ducts to multiple exit locations. This can be helpful in designing the desired airflow around a moving vehicle. The exhaust air has relatively low velocity and relatively high pressure. This air can be fed into regions where it is useful—such as the blunt rear of the vehicle to create a "boat tail" effect, FIGS. 13 and 14 show other exemplary installations for the inventive turbine that do not involve a moving vehicle. In FIG. 13, multiple examples of the inventive turbine 10 have been mounted in a vertical rack that is affixed to a stationary point. The airflow in this case is simply the wind.

FIG. 14 shows a less obtrusive installation in a stationary structure. House 84 includes cave 86 under the edge of roof 88. One or more inventive turbines 66 are placed in the eave with a suitable inlet opening in the side of the cave. Exhaust flow from the one or more turbines is collected and ducted to an outlet 70.

The reader will therefore appreciate how the inventive turbine can be used to extract energy from a moving stream of air, preferably in a drag-inducing part of a moving vehicle. The reader will also appreciate how the control devices can be used to optimize the operation of the invention and to switch the invention on and off.

The invention can be installed and operated in a wide variety of ways. Examples include the following:

1. A controlled inlet door can be used with foe embodiment of FIG. 8. The inlet door can be opened selectively—such as during periods when the truck is moving with no trailer attached and during periods of braking.

2. The same embodiment of FIG. 8 can be operated as a "standby alternator." In this scenario the turbine can supplement the engine's alternator or replace it entirely if the alternator has failed.

The preceding description contains significant detail regarding the novel aspects of the present invention. It should not be construed, however, as limiting the scope of the invention but rather as providing illustrations of the preferred embodiments of the invention. Many other embodiments will be made apparent to those skilled in the art. Thus, the scope of the invention should be fixed by the following claims, rather than by the examples given.

Having described my invention, I claim:

1. A turbine for extracting energy from air flow moving over a drag-inducing fairing of a moving vehicle, comprising:
   (a) a housing;
   (b) a rotor mounted within said housing, said rotor having an outer perimeter and an axis of rotation;
   (c) a plurality of airfoils attached to said rotor, wherein each airfoil of said plurality of airfoils,
      (i) has a chord line running from said outer perimeter to said axis of rotation,
      (ii) has a first side that is flat and parallel to said chord line,
      (iii) has a second side that is convex, with said convex second side protruding outward in a direction of desired motion for said airfoil;
   (d) an inlet ramp configured to bend air flow coming into said turbine so that a majority of said air flow is directed toward airfoils moving away from said inlet ramp;
   (e) an electrical generator attached to said rotor; and
   (f) said inlet ramp being configured to pivot in order to create a variable ramp angle, with said ramp angle increasing with an increasing speed of said rotor and said ramp angle decreasing with a decreasing speed of said rotor.

2. The turbine for extracting energy from air flow as recited in claim 1, further comprising an actuator for setting a desired ramp angle of said inlet ramp.

3. The turbine for extracting energy from air flow as recited in claim 1, further comprising:
   (a) an inlet for said turbine on a forward-facing portion of said vehicle;
   (b) an outlet for said turbine on a lateral-facing side of said vehicle; and
   (c) an outlet duct configured to direct air exiting said rotor to said outlet on said lateral-facing side of said vehicle.

4. The turbine for extracting energy from air flow as recited in claim 1, further comprising an inlet door configured to selectively admit said air flow to said rotor.

5. The turbine for extracting energy from air flow as recited in claim 4, wherein said inlet door is smoothly contoured into said fairing.

6. The turbine for extracting energy from air flow as recited in claim 4, wherein said inlet door acts as said variable inlet ramp.

7. The turbine for extracting energy from air flow as recited in claim 1, wherein said fairing is part of a wind deflector on the cab of a truck.

8. The turbine for extracting energy from air flow as recited in claim 1, wherein said fairing is part of a hood on a car.

9. The turbine for extracting energy from air flow as recited in claim 1, wherein air flow exiting said turbine is directed to an outlet in said vehicle that is remote from said turbine.

10. A turbine for extracting energy from air flow moving over a moving vehicle, comprising:
   (a) a housing having an inlet, with said inlet being positioned to receive a portion of said air flow;
   (b) a rotor mounted within said housing and configured to receive flow from said inlet, said rotor having an outer perimeter and an axis of rotation;
   (c) a plurality of airfoils attached to said rotor, wherein each airfoil of said plurality of airfoils,
      (i) has a chord line running from said outer perimeter to said axis of rotation,
      (ii) has a first side that is flat and parallel to said chord line,
      (iii) has a second side that is convex, with said convex second side protruding outward in a direction of desired motion for said airfoil;
   (d) an inlet ramp configured to bend air flow coming through said inlet into said turbine so that a majority of said air flow is directed toward airfoils moving away from said inlet ramp;

(e) an electrical generator attached to said rotor; and
(f) said inlet ramp being configured to pivot in order to create a variable ramp angle, with said ramp angle increasing with an increasing speed of said rotor and said ramp angle decreasing with a decreasing speed of said rotor.

11. The turbine for extracting energy from air flow as recited in claim 10, further comprising an actuator for setting a desired ramp angle of said inlet ramp.

12. The turbine for extracting energy from air flow as recited in claim 10, further comprising:
(a) an inlet for said turbine on a forward-facing portion of said vehicle;
(b) an outlet for said turbine on a lateral-facing, side of said vehicle; and
(c) an outlet duct configured to direct air exiting said rotor to said outlet on said lateral-facing side of said vehicle.

13. The turbine for extracting energy from air flow as recited in claim 10, further comprising an inlet door configured to selectively admit said air flow to said rotor.

14. The turbine for extracting energy from air flow as recited in claim 13, wherein said inlet door is smoothly contoured into a fairing on said moving vehicle.

15. The turbine for extracting energy from air flow as recited in claim 13, wherein said inlet door acts as said variable inlet ramp.

16. The turbine for extracting energy from air flow as recited in claim 10, wherein said fairing is part of a wind deflector on the cab of a truck.

17. The turbine for extracting energy from air flow as recited in claim 10, wherein said fairing is part of a hood on a car.

18. The turbine for extracting energy from air flow as recited in claim 10, wherein air flow exiting said turbine is directed to an outlet in said vehicle that is remote from said turbine.

* * * * *